(12) United States Patent  (10) Patent No.: US 7,286,795 B2
Ducasse  (45) Date of Patent: Oct. 23, 2007

(54) SYSTEM AND METHOD FOR EFFECTIVE RECEPTION AND TRANSMISSION OF SATELLITE SIGNALS

(75) Inventor: Jean-Claude Ducasse, Taluyers (FR)

(73) Assignee: MDS America, Inc., Stuart, FL (US)

( * ) Notice: Subject to any disclaimer, the term of this patent is extended or adjusted under 35 U.S.C. 154(b) by 230 days.

(21) Appl. No.: 10/625,806

(22) Filed: Jul. 23, 2003

(65) Prior Publication Data

US 2005/0020204 A1    Jan. 27, 2005

(51) Int. Cl.
*H04B 7/185*    (2006.01)

(52) U.S. Cl. .................... 455/12.1; 455/3.02; 455/136; 455/138; 455/234.1

(58) Field of Classification Search ............... 455/3.01, 455/3.02, 136, 138, 232.1, 234.1, 234.2, 455/12.1
See application file for complete search history.

(56) References Cited

U.S. PATENT DOCUMENTS

| | | | |
|---|---|---|---|
| 5,323,423 A * | 6/1994 | Townsend et al. .......... 375/232 |
| 5,483,663 A | 1/1996 | Tawil |
| 5,761,605 A | 6/1998 | Tawil et al. |
| 5,999,794 A | 12/1999 | Loyer |
| 6,169,878 B1 | 1/2001 | Tawil et al. |
| 6,240,281 B1 | 5/2001 | Le Roux et al. |
| 6,344,832 B1 | 2/2002 | Lotfy |
| 6,430,742 B1 | 8/2002 | Chanteau |
| 6,493,873 B1 * | 12/2002 | Williams ....................... 725/78 |
| 6,512,428 B1 | 1/2003 | Hirtzlin et al. |
| 6,519,446 B2 | 2/2003 | Tawil et al. |
| 6,549,754 B1 | 4/2003 | Miller et al. |
| 6,549,755 B2 | 4/2003 | Chu et al. |
| 6,771,719 B1 * | 8/2004 | Koyama et al. ............. 375/345 |
| 2003/0119463 A1 * | 6/2003 | Lim ........................ 455/245.1 |
| 2003/0148747 A1 * | 8/2003 | Yamamoto ............... 455/234.1 |
| 2004/0028149 A1 * | 2/2004 | Krafft et al. ................. 375/316 |
| 2004/0060065 A1 * | 3/2004 | James et al. .................... 725/71 |
| 2004/0214537 A1 * | 10/2004 | Bargroff et al. ............. 455/136 |
| 2004/0214545 A1 * | 10/2004 | Kushima et al. .......... 455/232.1 |
| 2004/0248536 A1 * | 12/2004 | Sato et al. ................ 455/232.1 |

* cited by examiner

*Primary Examiner*—Matthew Anderson
*Assistant Examiner*—Sujatha Sharma
(74) *Attorney, Agent, or Firm*—Malin, Haley & DiMaggio, P.A.

(57) ABSTRACT

The present invention relates to a system and method for terrestrial transmission of RF signals comprising: an antenna, where said antenna includes an active device and a passive device and a decoder. The passive device receives RF signals and passes the signals to the active device. The active device includes at least one amplifier, where active device down converts the RF signals to IF signals and applies a gain to at least one of the RF signals and the IF signals. The decoder connects to the antenna, where decoder receives and analyzes the IF signals from said antenna and upon receipt of the IF signals sends commands to the active device in order to maintain an acceptable IF signal, where said commands instruct the active device to selectively adjust the gain.

32 Claims, 13 Drawing Sheets

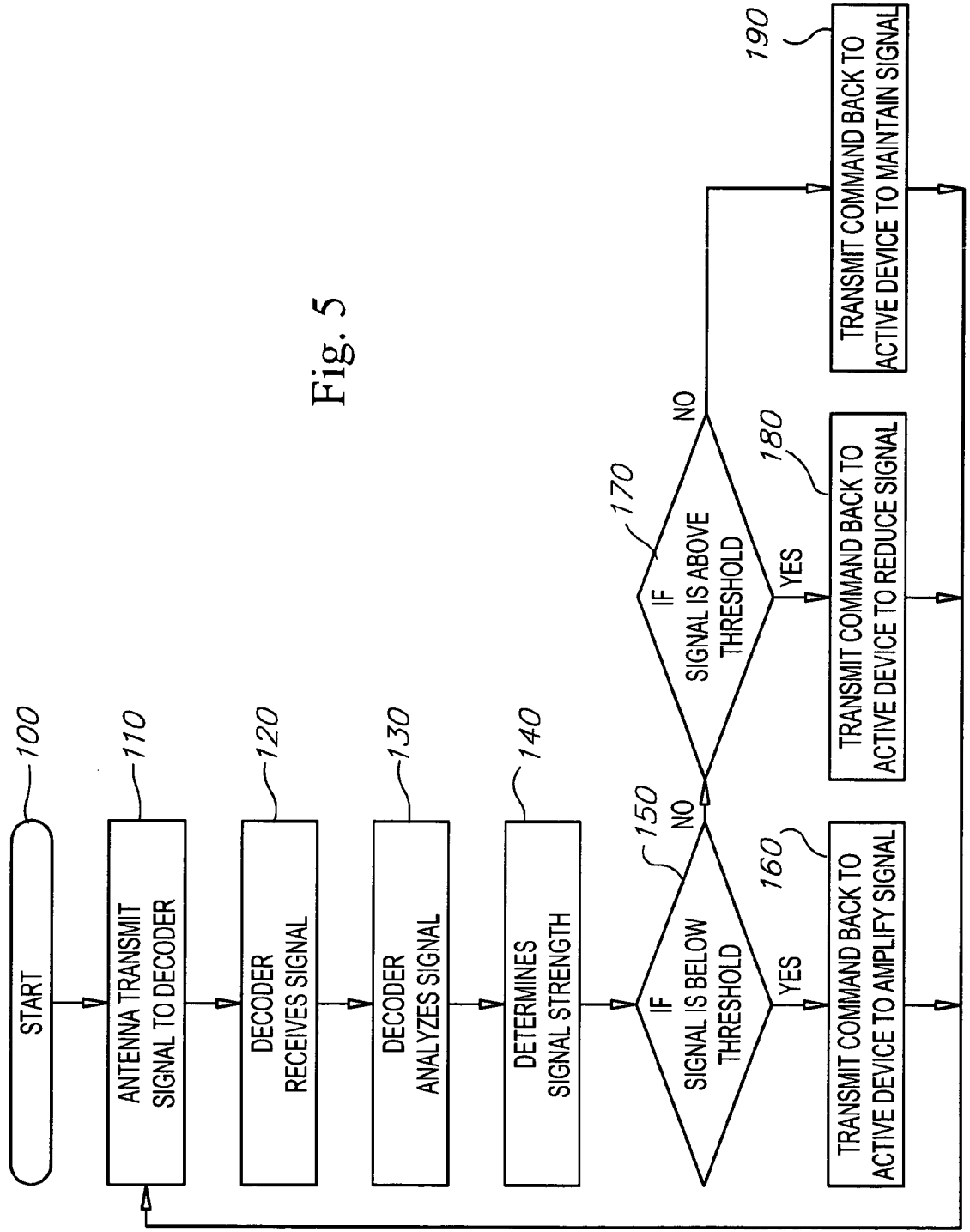

SYSTEM AND METHOD FOR EFFECTIVE RECEPTION AND TRANSMISSION OF SATELLITE SIGNALS

BACKGROUND OF THE INVENTION

1. Field of the Invention

The present invention relates to a hypercable antenna control (HyCAnC®) process for individual reception and collection of Lband distribution for terrestrial transmission networks, particularly for Hypercable transmission networks or satellite transmission networks.

2. Description of Related Art

Receiver/Decoders, analog or digital, used in network and/or satellite transmission networks usually have a reception range associated with normal use. Most satellite decoders have a signal range from −70 dBm to −20 dBm although some decoders may have different limitations, but the principle remains the same for all type of systems. Antennas receive RF signals for down conversion and transmission to the decoders. The antennas used in network and satellite transmissions usually have a passive device, i.e., offset-dish—array—dipoles, and an active device, which includes a mixer for down conversion and a low noise amplifier (LNA) that amplifies the signal received by the passive device. The active device may include several amplification stages that may amplify either the RF signal, IF signal, or both the RF and IF signals. Similar to decoders, the amplifiers used in the antennas are also subject to limitations and have operational ranges associated with them.

Terrestrial transmission of signals involves the transmission of signals horizontally across a terrestrial plane. Transmitters may receive RF signals from a satellite and transmit the RF signals to antennas that down convert and transmit to an end user decoder. The signal strength between the transmitter and decoder usually correlates to the distance of between the receiver/decoder and the transmitter. At relatively short distances between the receiver/decoder and transmitter, the signal strength tends to be very high, conversely as at longer distances between the receiver/decoder and transmitter signal strength tends to weaken and become very low. Consequently, the decoder's operational parameters, upper and lower limits, may well depend upon the distance between the receiver/decoder and transmitter, where if the distance is too close or too great, then the receiver/decoder will not probably receive the signal. Table A, below, shows some exemplary readings which demonstrate characteristics associated with terrestrial transmission.

TABLE A

|  |  | One Carrier | 15 Carriers |
|---|---|---|---|
| Distance from Transmitter = 2 km | Level = −90 dBm | Level = −75 dBm | Level = −60 dBm |
| Distance from Transmitter = 32 km | Level = −120 dBm | Level = −99 dBm | Level = −84 dBm |

In contrast, satellite signal transmission functions in a different manner than terrestrial transmission. The signals associated with satellite transmissions are usually uniform across a large area. The satellite signal transmissions are substantially the same for an entire continent and/or country and a receiver/decoder receiving satellite signals usually receive substantially the same signal strength wherever the receiver/decoder is located inside the satellite footprint. Table B shows exemplary readings associated with satellite transmissions.

TABLE B

| Satellite Reception Field Levels −150 dBw (−120 dBm): | |
|---|---|
| Paris = | −120 dBm dist from Satellite = 36,400 km |
| Barcelona = | −120 dBm dist from Satellite = 36,200 km |

Base upon the foregoing, one can realize that the modification of terrestrial transmission may be necessary in order to ensure proper receipt by the decoders. The amplifiers within the antenna's active device may be used to address problems associated with terrestrial signal transmission. Usually these amplifiers apply a gain to the RF signal or converted IF signal in order to prevent fading that may occur. The amplifier may however inadvertently and unnecessarily amplify signals with sufficient strength for reception by the decoder. On these occasions, the amplifiers actually saturate the signal and consequently produce a signal that is too strong for reception by the decoder, such as in one exemplary embodiment a 1 GHz LNB may have an max gain of −55 dBm.

U.S. Pat. No. 6,512,428 to Hirtzlin et al. (Hirtzlin) relates to a device which affects the simultaneous reception/transmission of signals between a decoder and terrestrial base station. The Hirtzlin device employs a low-noise amplification stage in order to control parasitic coupling between the transmission and reception signals. The reception path may be disturbed by a parasitic signal created by coupling of the transmission signal transmitted over the transmission path. The parasitic signal may saturate the input stage of the reception path and the Hirtzlin device provides a means to minimize the degradation brought about by the parasitic signal.

U.S. Pat. No. 6,549,754 to Miller et al. (Miller) relates to an in-flight entertainment (IFE) system that provides live video/audio programming to passengers and operators over an aircraft video/audio distribution system. The Miller system uses programming signals from intermediate frequency (IF) signals that are produced by frequency down converting satellite broadcast signals and supplied over a pair of IF signal output cables. The Miller also uses control signals and DC power in the frequency down conversion process over the IF signal output cables in a reverse direction.

U.S. Pat. No. 6,549,755 to Chu et al. (Chu) relates to a method and apparatus for monitoring and controlling the operating point of a satellite transponder amplifier. Chu is directed toward controlling the transmission of signals from a satellite to terrestrial transponders. The Chu apparatus develops a histogram of the received signal and compares the acquired histogram to a template histogram in order to determine an amount of compression. The apparatus then uses the amount of compression to determine the operating point of the satellite transponder amplifiers.

The prior art however fails to address fading and saturation that may occur between a terrestrial antenna and an end user decoder. It would accordingly be advantageous to have a system and method to selectively amplify and control the amplification of input signals to the decoder based upon instantaneous commands from the target decoder. By using the decoder commands, the active device of the antenna may readily maintain an acceptable IF signal for receipt by the decoder while avoiding the saturation and fading problems discussed above.

SUMMARY OF THE INVENTION

The present invention relates to a system and method for terrestrial transmission of RF signals where a HyCAnC® antenna in conjunction with a HyCAnC® decoder actively and selectively control the transmitted IF signal from the HyCAnC® antenna. The HyCAnC® decoder continuously analyzes the received IF signal and instantaneously transmits commands to the HyCAnC® antenna. The commands provide the HyCAnC® antenna with instructions with respect to the selective amplification of the IF signal. Based upon the commands, the HyCAnC® either maintains, amplifies or de-amplifies the gain applied to either the RF signal, IF signal or both signals in order to maintain an acceptable IF signal for receipt by the HyCAnC® decoder. The present invention therefore maintains an optimal IF signal through the use of the HyCAnC® antenna and decoder.

It is therefore an object of the present invention to provide a system that includes an antenna and a decoder, where the antenna further includes an active device and a passive device. The passive device receives RF signals and passes the signals to the active device. The active device includes at least one amplifier, down converts the RF signals to IF signals and applies a gain to at least one of the RF signals and the IF signals. The decoder connects to the antenna, where decoder receives the IF signals from said antenna and upon receipt of the IF signals sends commands to the active device in order to maintain an acceptable IF signal, where the commands instruct the active device to selectively adjust the gain.

It is yet another object of the present invention to provide a method for a terrestrial transmission of RF signals comprising the steps of: receiving RF signals via an antenna; down converting RF signals to IF signals; transmitting the IF signals via a wire to a decoder; transmitting commands via the wire to the antenna from the decoder upon receipt of the IF signals; adjusting the RF signals and the IF signals based upon the commands; and maintaining an acceptable IF signal for receipt by the decoder.

It is yet another object of the present invention to provide a system for terrestrial transmission of RF signals comprising: a plurality of antennas, where each antenna includes an active device that down converts the RF signals to IF signals and a passive device that receives RF signals; a plurality of master decoders that receive and analyze the IF signals from each antenna and upon receipt of the IF signals, sends commands to each respective active device in order to maintain an acceptable IF signal; and a distribution switch that receives each IF signal transmitted through each master decoder and transmits each IF signal to a plurality of end user decoders that receive and analyze the IF signals from said distribution switch, and upon receipt of the IF signals send commands to the distribution switch in order to maintain an acceptable IF signal.

In accordance with these and other objects which will become apparent hereinafter, the instant invention will now be described with particular reference to the accompanying drawings.

BRIEF DESCRIPTION OF THE DRAWINGS

FIG. 5 shows an exemplary method according to the present invention.

DETAILED DESCRIPTION

Figure 1A:
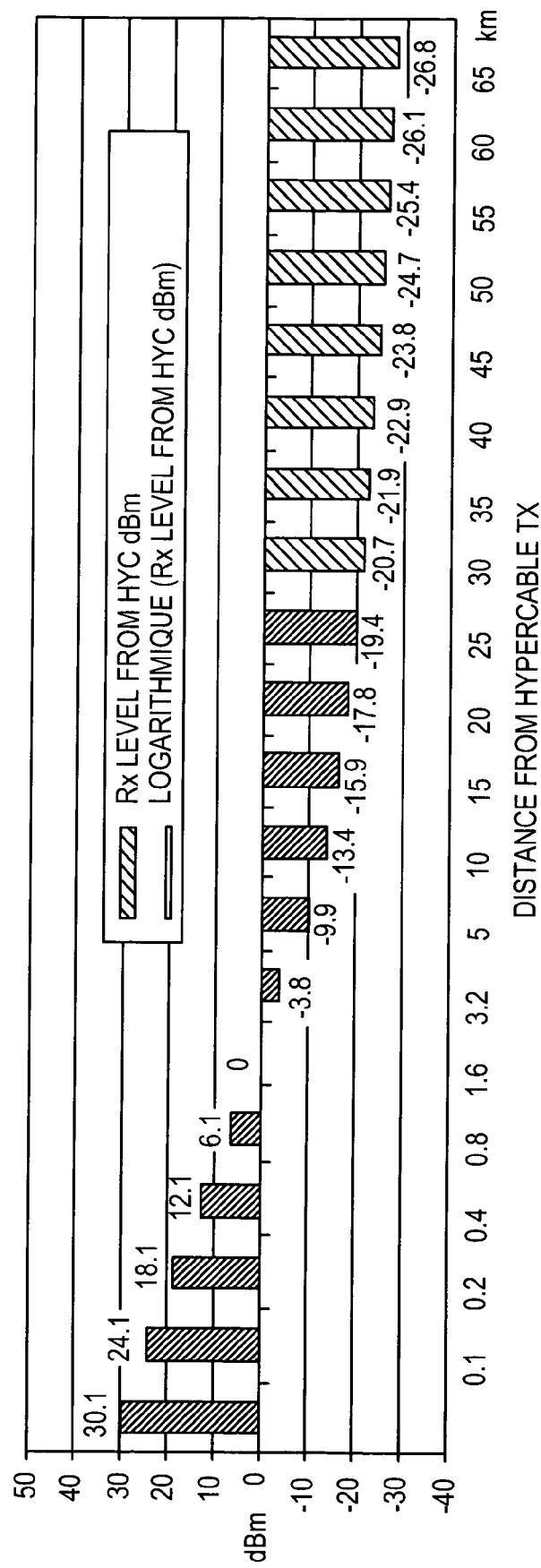
FIG. 1A shows a graph of a signal range associated with an exemplary terrestrial broadcast network.

The present invention improves the reception of digital or analog signals within a terrestrial network under all signal level conditions. The present invention also improves the satellite reception capabilities as well as the reception for Lband distribution networks. The present invention maintains the signal level of the receiver/decoder and the active antenna inside their reception level limitation (maximum and minimum). The present invention resides within the reception antenna and the receiver/decoder. For the antenna, the present invention may be installed within memory residing inside the active portion of the antenna, i.e., LNA, a HCC antenna, LNB or other amplification device. The present invention provides a special antenna, a HCC antenna, which is able to adjust the gain of the active device automatically in order to keep the received signal level within the functional limitations of the receiver/decoder as well as the amplification circuits of the active device. When comparing a prior art satellite antenna with the HCC antenna of the present invention, the prior art satellite antenna has a fixed gain (active and passive device) and is not able to have any gain adjustment, in contrast, the HCC antenna of the present invention will automatically adjust the HCC antenna gain depending on the received signal level. The HCC antenna delivers the terrestrial signal to the receiver/decoder and the receiver/decoder reciprocally transmits control commands back to the HCC antenna. The HCC antenna receives the control commands in order to set the appropriate gain. The control command type depends upon the signal analysis of the decoder. The commands, which are sent by the decoder for controlling the HCC antenna, are sent through the same cable as the one that is delivering the reception signal from the antenna to the decoder. The commands that are sent by the decoder to the HCC antenna are currently using the existing DiSEqC process, i.e., DiSEqC 1.0, DiSEqC 1.2, DiSEqC 2.0. However, in several cases the DiSEqC process can't be used, therefore any other type of signal, existing and future, can be used for the HyCAnC® process, i.e., voltage, modulation, or any other future standards.

The active part of the HCC antenna, LNB, LNA, is designed with several amplification stages, which may amplify received signal, convert the signal received to a lower band and amplify the lower band signal. Each amplification stage has its own set parameters. The object of the present invention is to avoid sending a signal outside of the parameters for each one of the amplifier stages. When the signal coming to the HCC antenna is too strong for transmission to the decoder or the LNA-LNB, the HCC antenna will adjust to the appropriate configuration in order to avoid saturating the amplification stage. If the incoming signal is too low, then the HCC antenna will adjust to the appropriate amplification stage in order to have enough signal. The decoder of the present invention controls all these functions.

Figure 1B:
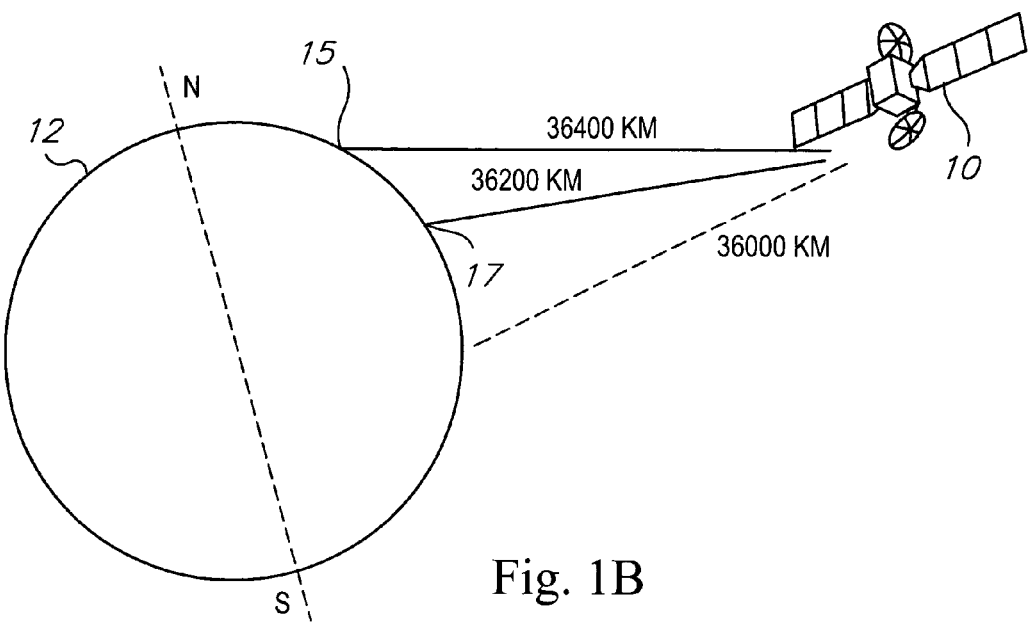
FIG. 1B shows an overview of a satellite signal transmission.
Figure 2:
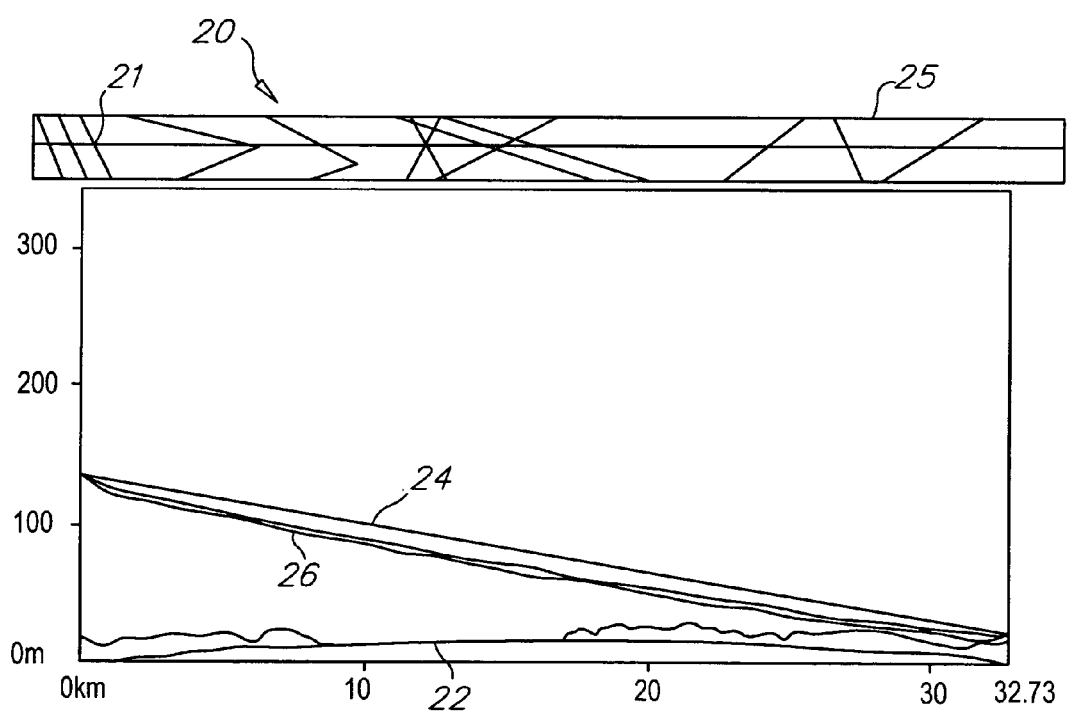
FIG. 2 shows a graph of terrestrial signal transmission over a topography.

FIG. 1a shows a graph of the signal strength with a typical terrestrial broadcast network. As can be seen in the graph, the decoder receives signals once the transmitter is beyond 30 kilometers from the decoder. At distances less than 30 kilometers, the signal strength is too strong for the decoder to properly function and to receive the signal. The reception range for the decoder is −20 dBm to −70 dBm. As shown in the graph, this range begins to be realized at beyond 30 kilometers. Referring now to FIG. 1b, a overview of a satellite signal transmission is shown. As can be seen in FIG. 1b, satellite 10 maintains an orbit around the earth 12. The satellite 10 orbits the earth 12 at about 36,000 km and as shown in FIG. 1b, it translates to 36,200 km from transmitter 17 and 36,400 km from transmitter 15. Although, a 200 km difference exists between the transmitters 15 and 17, signal strength remains constant due to the transmitters being within the satellite's 10 footprint. Referring now to FIG. 2, a terrestrial reception graph is shown. This terrestrial reception graph 20 shows the signal strength in relation to the distance from transmitter 21 over the shown topography. Transmitter 21 is shown at the top of the graph, a top view 25 of the topography of an exemplary area. Below the top view 25 of the topography is shown a line of sight 24 in relation to a horizon view of the topography 22. The signal strength is shown to drop off as the distance increases from transmitter 21. Usually Hypercable networks are occupying a spectrum of 1 or 2 Ghz (10.6 Ghz to 11.6 Ghz or 12.6 Ghz). Fading phenomenon does not occur proportionally for the entire 1 Ghz spectrum, but only for small part of the spectrum (around 100-200 Mhz bandwidth). When the fading happens on a frequency that is not monitored by a decoder, then the antenna output level won't be modified and the end user connected to the Multiswitch will loose some carriers that are affected by the fading phenomenon.

Due to the steady drop off of signal strength along a terrestrial signal transmission, a significant amount of fading may occur in relation to receipt of the signal by decoder. To address problems associated with fading, many decoders that receive signals from antenna implore the use of amplifiers to ensure signal strength is acceptable for proper transmission through the decoder. The amplification signal is usually taken without consideration of the actual received signal strength and therefore, the signal may become saturated by over amplification of an already strong signal. The present invention actively monitors the signal strength and adjusts amplification accordingly to avoid both fading and saturation that may be associated with the signal transmission and amplification thereof. The present invention uses a special HCC antenna, which is able to actively adjust the gain of the amplifier in response to the received signal by the HCC decoder. Some of the antennas of the prior art include an active and a passive device, where the active device includes amplifiers that amplify the received signals. The passive device receives signals from the target satellite. The amplifiers of the prior art, however, have a fixed gain, as opposed to a gain that may be readily adjusted based upon the received signal strength. The HCC antenna automatically adjusts the antenna gain depending on the received signal strength, and therefore avoids saturation that might occur and also prevents any fading of weak signals.

Figure 3A:
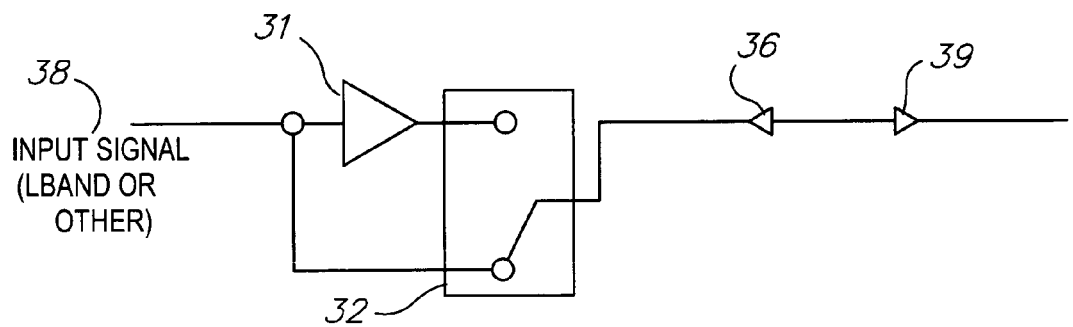
FIG. 3A shows an exemplary amplifier for the present invention.
Figure 3B:
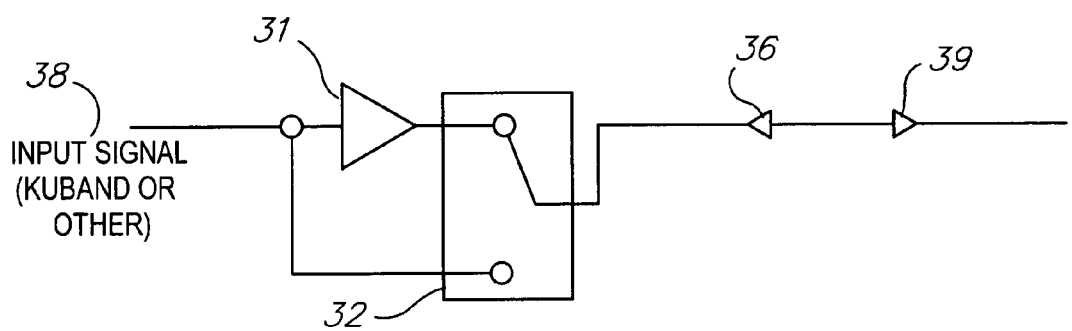
FIG. 3B shows an exemplary amplifier for the present invention as activated by decoder commands.

FIG. 3a shows an exemplary amplifier according to the present invention. An input signal 38 enters into an input amplifier 31, which is in parallel with a switch 32 that transmits an output signal 39. The switch 32 is shown to bypass the input amplifier 31 and allow input signal 38 to transmit without amplification. Arrow 36 shows a HCC decoder command signal that is sent to the switch 32. The switch 32 then either remains open, and therefore, bypassing input amplifier 31 as shown in FIG. 3a or switch 32 may close and then allow the amplification of input signal 38 through the input amplifier 31 as shown in FIG. 3b. The HCC decoder, therefore, actively monitors the signal strength received, alerts the switch 32 to bypass the input amplifier 31 or to close and allow amplification of the input signal 38. The input amplifier 31 provides a +15 dB gain for input signal 38 when the switch 32 is in a closed position. The HCC decoder is based on any existing decoder of the market, i.e., Satellite, QPSK, 8PSK, OFDM, COFDM, 8VSB, QAM, in which a special process, HyCAnC®, must be implemented.

Figure 4A:
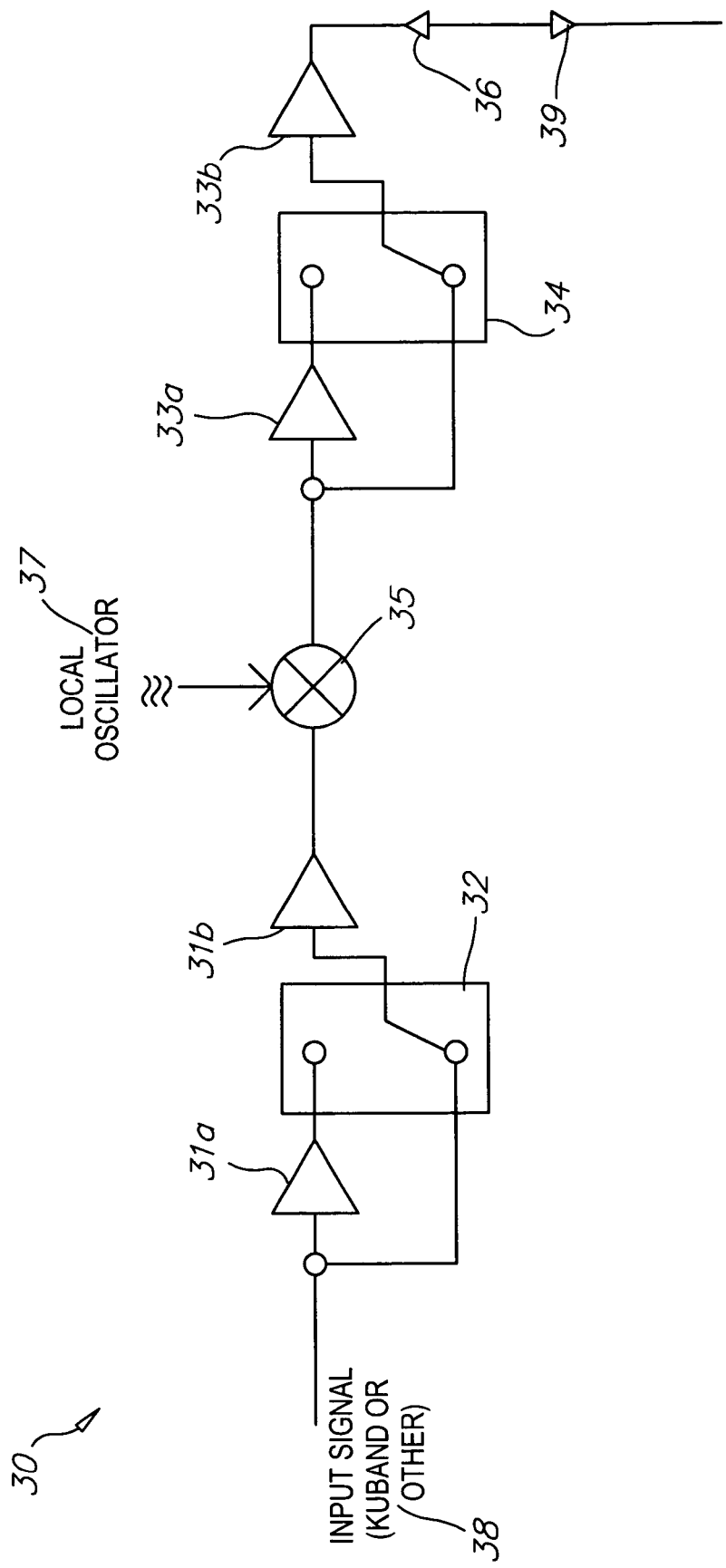
FIG. 4A shows an active device of an antenna with a 30 dB gain according to the present invention.

FIGS. 4a through 4d show various applications of the active device of the HCC antenna. FIG. 4a shows an amplifier configuration that allows for a 30 dB gain to be applied to the input signals 38. Two input amplifiers 31a, 31b are shown forward of a mixer 35 and two output amplifiers 33a, 33b are downstream of the mixer 35. A RF switch 32 is shown to bypass the first input amplifier 31a but allows for the input signal 38 to pass through input amplifier 31b and forward into the mixer 35 which includes a local oscillator 37. The mixer 35 down converts high frequency RF signal to an intermediate frequency (IF) to be received by the HCC decoder. The IF signal leaving mixer 35 leads into output amplifier 33b and then is sent to the HCC decoder. As can be seen an IF switch 34 bypassed the output amplifier 33a and then allows for the transmission of the IF signal through output amplifier 33b. Accordingly, a 15 dB gain is placed upon the input RF signal, and a 15 dB gain is placed on the output IF signal, thus providing a 30 dB total gain for the output signal 39 being sent to the HCC decoder. As a response to receipt of the output signal 39, the HCC decoder transmits commands back to the active device 30 which determines the activation or deactivation of RF switch 32 and IF switch 34.

Figure 4B:
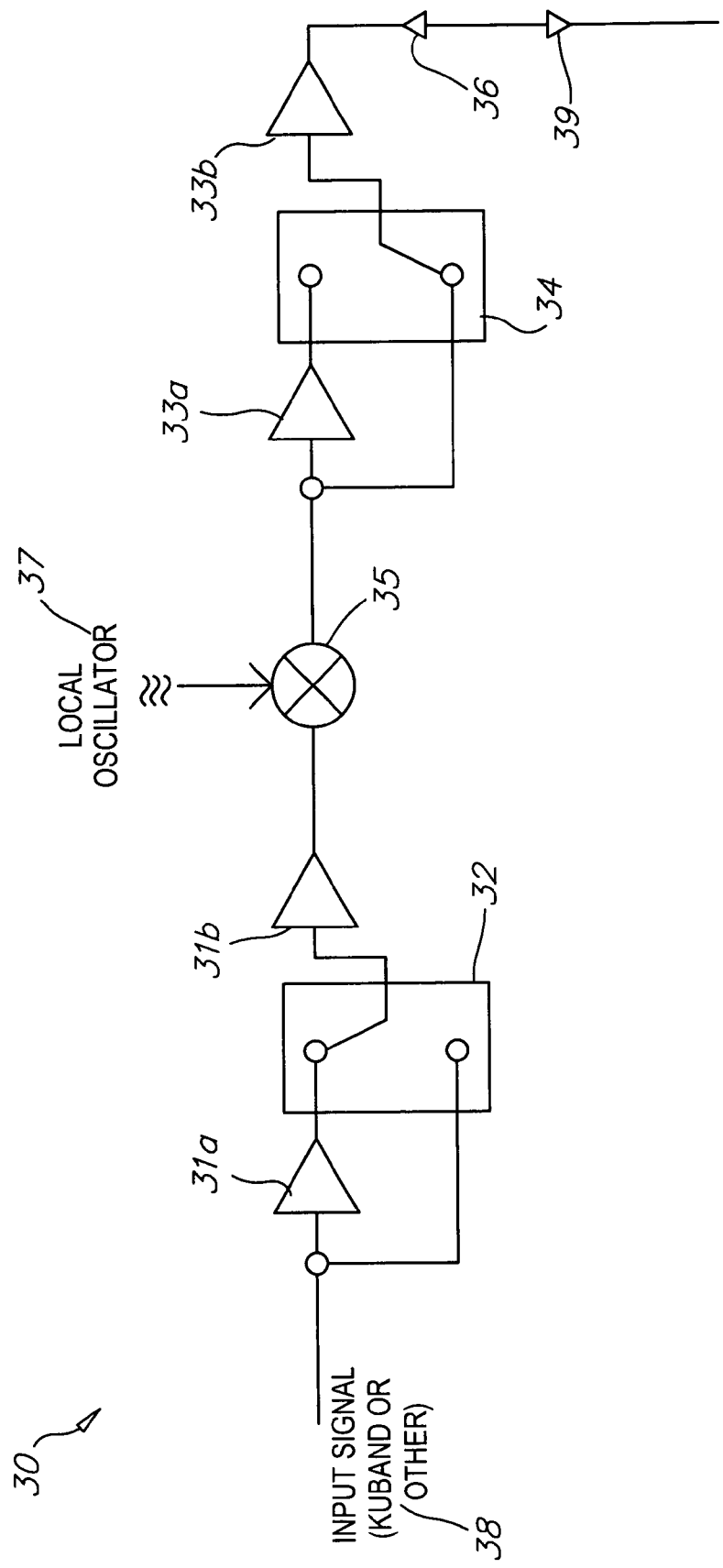
FIG. 4B shows an active device of an antenna with a 45 dB gain according to the present invention.
Figure 4C:
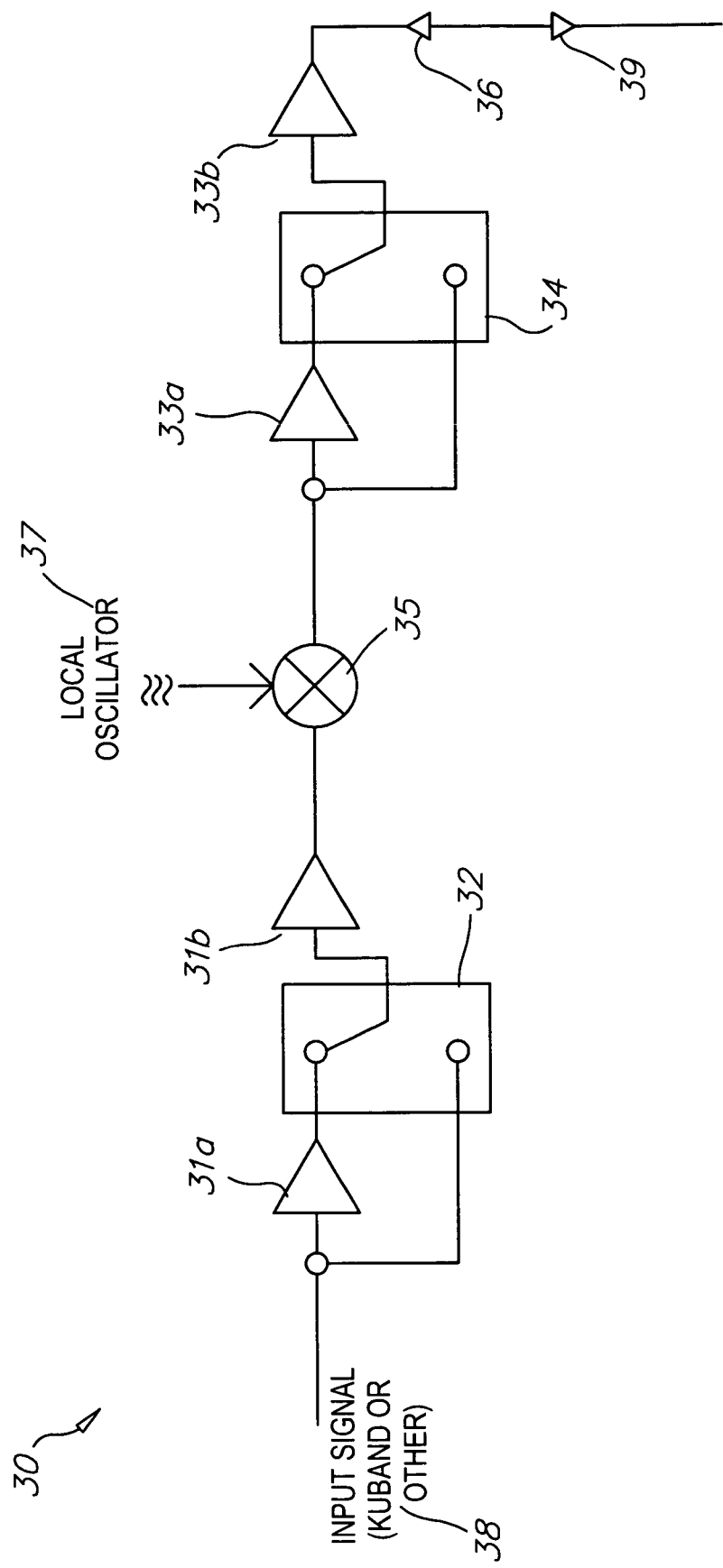
FIG. 4C shows an active device of an antenna with a 60 dB gain and 45 dB gain according to the present invention.
Figure 4D:
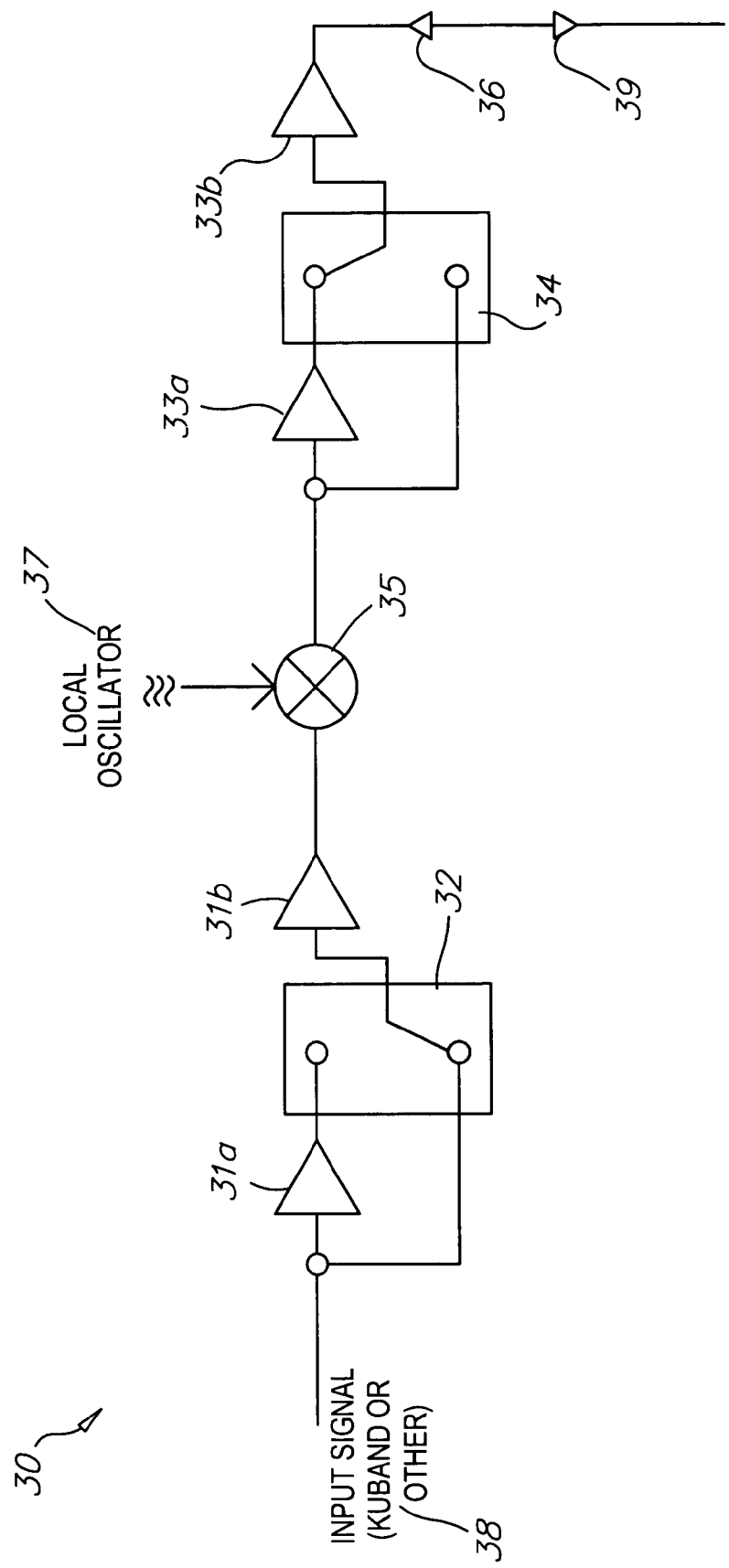
FIG. 4D shows an active device of an antenna with a 60 dB gain and 45 dB gain according to the present invention.

Referring now to FIG. 4b, a 45 dB gain is shown on the active device 30. The RF switch 32 of FIG. 4b is shown to be closed, and therefore allowing the transmission of input signal 38 through both input amplifiers 31a and 31b and providing a 30 dB gain prior to transmission into the mixer 35. The IF switch 34 remains open and bypassing output amplifier 33a and providing a 15 dB gain upon the IF signal being sent to the HCC decoder. Referring now to FIG. 4c, a 60 dB gain configuration of the active device 30 is shown. The RF switch 32 is closed therefore transmitting the input signal through both input amplifiers 31a and 31b and providing a 30 dB gain on the input signal 38. The IF switch 34 is also closed, therefore the IF signal passes through output amplifiers 33a and 33b, providing a 30 dB gain upon the IF signal prior to transmission to the HCC decoder. Accordingly, the configuration of the active device 30 of FIG. 4c provides a total 60 dB gain for output signal 39. Referring now to FIG. 4d, a 45 dB gain amplification configuration is shown in relation to the active device 30. The RF switch 32 of FIG. 4d bypasses the input amplifier 31a and provides a 15 dB gain on the input signal into the mixer 35. However, the IF switch 34 is closed, so the output IF signal travels through both output amplifiers 33a and 33b. Accordingly, the IF signal transmitted to the decoder is subject to a 30 dB gain, so the total gain is 45 dB.

FIG. 5 shows an exemplary method according to the present invention. Initially, the HCC antenna transmits a signal to the HCC decoder, step 110. The HCC decoder receives the signal, step 120, and analyzes the signal's strength, step 130. The HCC decoder determines the signal's strength, step 140, and then if the signal is below a lower threshold, step 150, the decoder transmits amplification commands back to the active device of the HCC antenna, step 160, in order to amplify the signal and place it into the proper range for reception. If the received signal by the HCC decoder is above a certain threshold, step 170, then the HCC decoder transmits commands back to active device to reduce the amplification of levels, step 180, associated with the signal. If the signal analysis of the HCC decoder determines that the received signal is within the acceptable range, then the HCC decoder transmits commands back to the active device, step 190, to maintain the current amplification levels.

Figure 6:
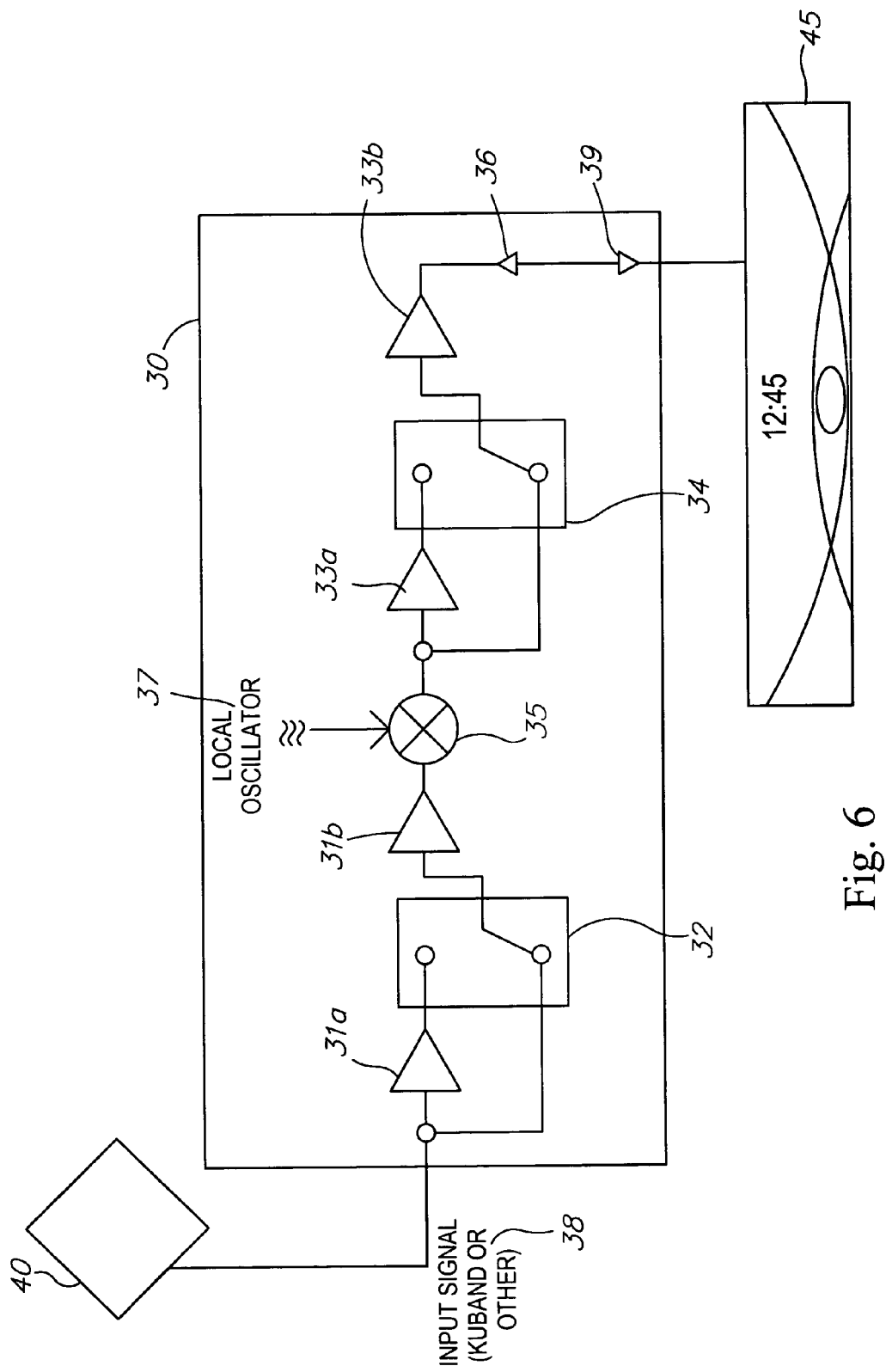
FIG. 6 shows an overview of a HyCAnC (HCC) antenna, an active device and a HCC decoder.

FIG. 6 shows an overview of the HCC antenna 40 receiving signals for input into active device 30 and then outputting the signals to the HCC decoder 45. The active device 30 of FIG. 6 is shown with two input amplifiers and two output amplifiers as discussed in relation to FIGS. 4a through 4d. Although active device 30 has been described within this application with up to four amplification stages, two residing on each side of mixer 35, additional or less amplification stages may be implemented on both the input and output sides mixer 35 and the gain associated with the individual amplifiers may also vary.

Figure 7:
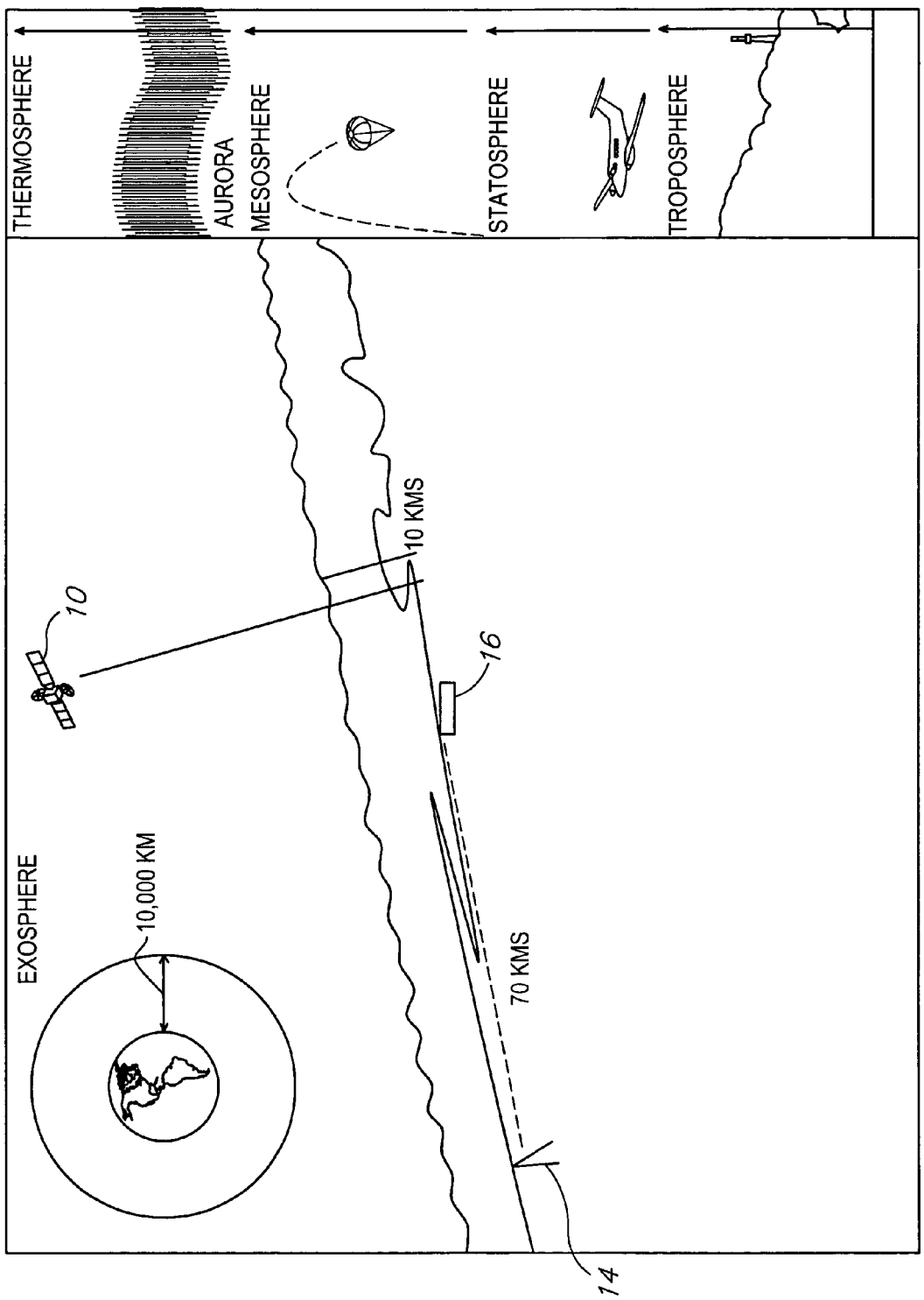
FIG. 7 shows an overview of a comparison of satellite signal and terrestrial signal transmissions.

FIG. 7 shows an overview of the terrestrial transmission that the present invention addresses as compared to satellite signal transmissions. Satellite transmission, as shown in FIG. 7, starts initially from satellite 10 and is transmitted to a receiver through the earth's atmosphere. To the right of FIG. 7 is shown the layers of the earth's atmosphere. Satellite signal transmission is directed through these layers toward a transmitter residing on the earth's surface. The satellite 10 orbits the earth in the region referred to as exosphere, which is the top of the thermosphere. Below the thermosphere are the regions referred to as the mesosphere, stratosphere, and troposphere. The most volatile level of the earth's atmosphere is the troposphere, which is the lowest atmospherical area surrounding the earth, which starts at the earth's surface and extends to 8 to 14 kilometers high. The troposphere is the most dense, and all of weather activity takes place within this region. The satellite signal transmitted from satellite 10 penetrates each level of the atmosphere in a pinpoint manner as shown in FIG. 7. However, a terrestrial transmission which takes place between hypercable antenna 16 and hypercable transmitter 14 is transmitted across the troposphere exclusively. The satellite signal transmission exposure to the troposphere prior to being received by a transmitter is fairly limited, as opposed to terrestrial transmissions between a hypercable transmitter and a hypercable antenna which travel across the troposphere entirely, and therefore are subject to various types of interference and accordingly have a higher degree of fluctuation as opposed to satellite signal transmissions.

Figure 8:
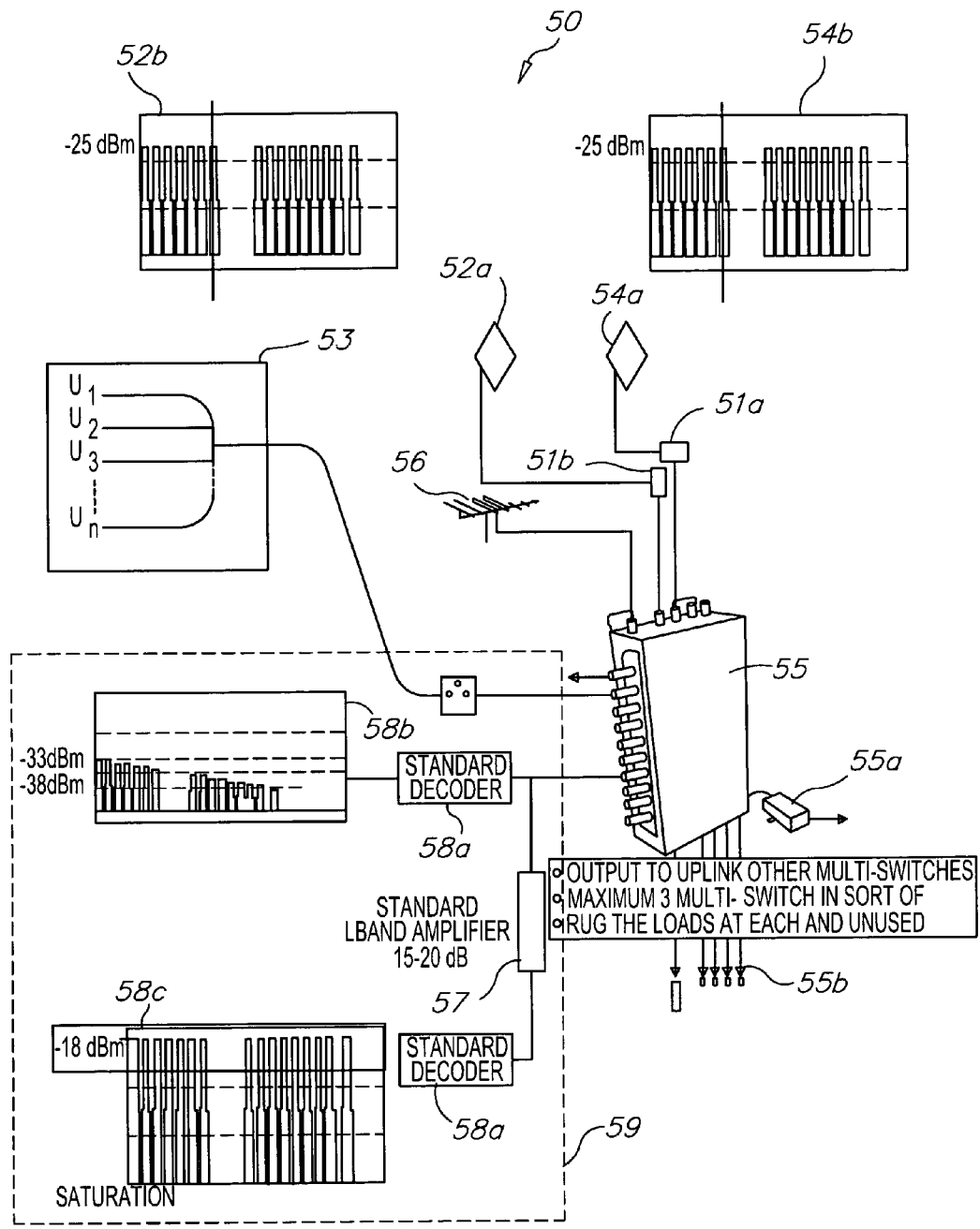
FIG. 8 shows a standard configuration for collective distribution.

FIG. 8 shows a standard configuration 50 for collective distribution of a satellite signal using a standard Lband amplifier. The configuration of FIG. 8 includes a vertical polarization antenna 52a and a horizontal polarization antenna 54a which feed into master decoders 51a and 51b. The master decoders 51a and 51b down convert the RF signals from antennas 52a and 54b to supply an IF signal to a distribution switch 55. The distribution switch 55 may also receive signals from a VHF/UHF antenna 56 for output to users connected to the distribution switch 55. The distribution switch 55 includes a power supply 55a and may transfer output to other switches through a distribution output 55b. The configuration of FIG. 8 includes the use of master decoders 51a, 51b to control and send commands to the antennas 52a and 54a, and therefore controls actions associated with those antennas 52a, 54a. However, individual decoders for each user further control distribution to users 53. These standard decoders 58a are shown in the user output analysis 59. When the IF signals are received from the distribution switch 55 and sent through a standard decoder without passing through an amplifier, the signals received by users, may be received in an acceptable range as shown in signal analysis 58b. However, when acceptable signals are sent through a standard Lband amplifier 57, the user receives saturated signals unacceptable for receipt by the decoder as shown in signal analysis 58c. Accordingly, the HCC process of the present invention may be advantageously used both upon the receipt of satellite signals and upon receipt of signals through a distribution switch as shown in FIG. 8.

Figure 9:
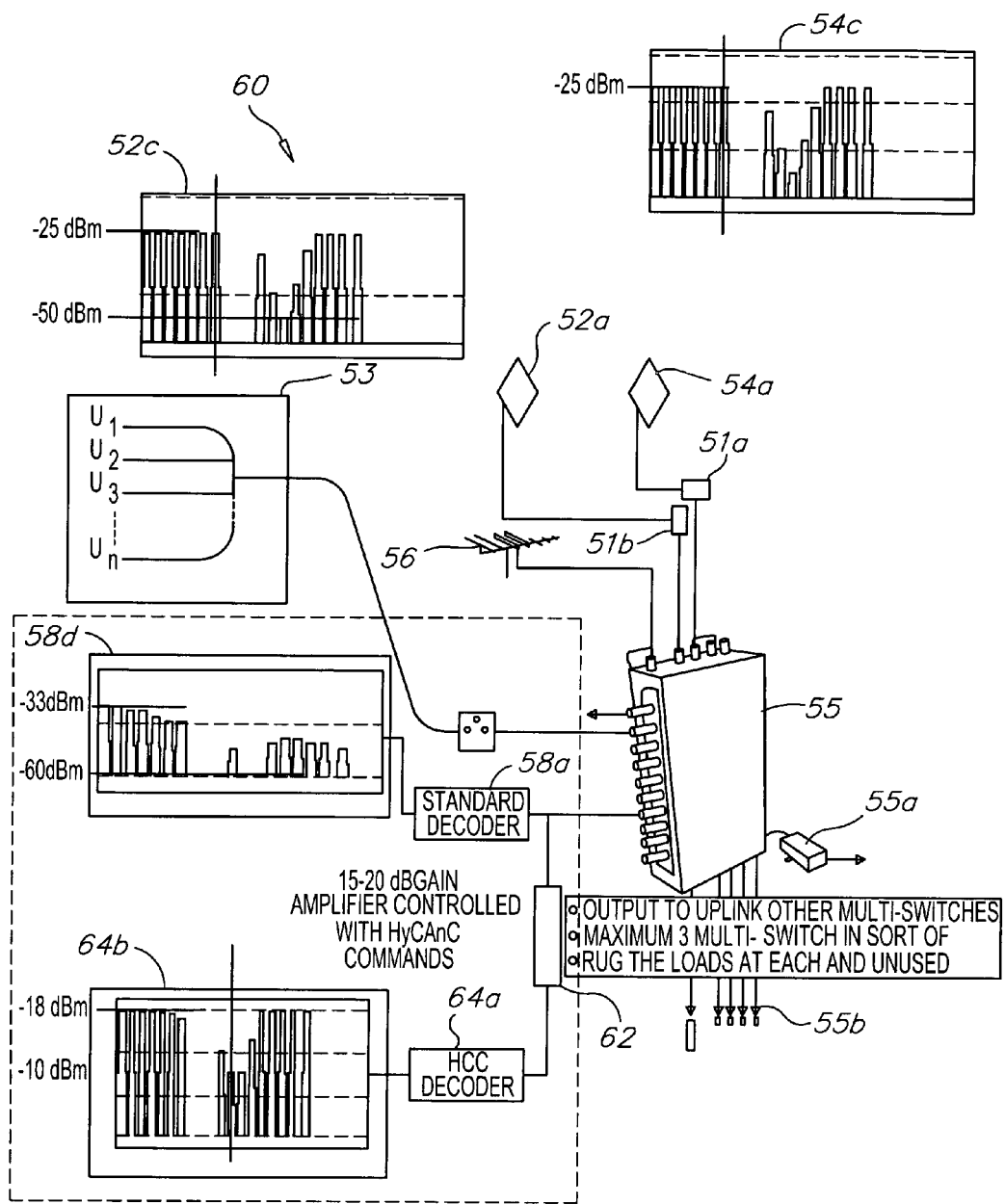
FIG. 9 shows a configuration for collective distribution using the HCC process of the present invention.

Referring to FIG. 9, the configuration of FIG. 8 is shown using a HCC decoder on the distribution side of the distribution switch 55. Configuration 60 of FIG. 9 addresses fading that may occur upon distribution of output signals from the distribution switch 55. As shown, signals transmitted through a standard decoder without any amplification may be subject to fading as shown signal analysis 58d. If the weaker signals however are transmitted through the HCC decoder 64a, the active device 62 properly amplifies the signal to the proper signal range for receipt by the user as shown in signal analysis 64b. Accordingly, the configurations of FIGS. 8 and 9 show the advantage of using the HCC decoder both as a master decoder for receipt of signals directly from satellites and for receipt of signals from a distribution switch 55. Use of HCC decoders in both signal paths ensures that end users receive acceptable signal strength for reception at their end user HCC decoder. The end user decoder such as HCC decoder 64a transmits commands back to the distribution switch 55, which includes an active device such as described earlier in this application. The HCC decoder 64a controls the amplification of signals for the end user as they are received from the distribution switch 55. Master decoders 51a and 51b transmit signals to the active devices residing on antennas 52a and 54a and therefore control the amplification of signals received directly from satellites.

Figure 10:
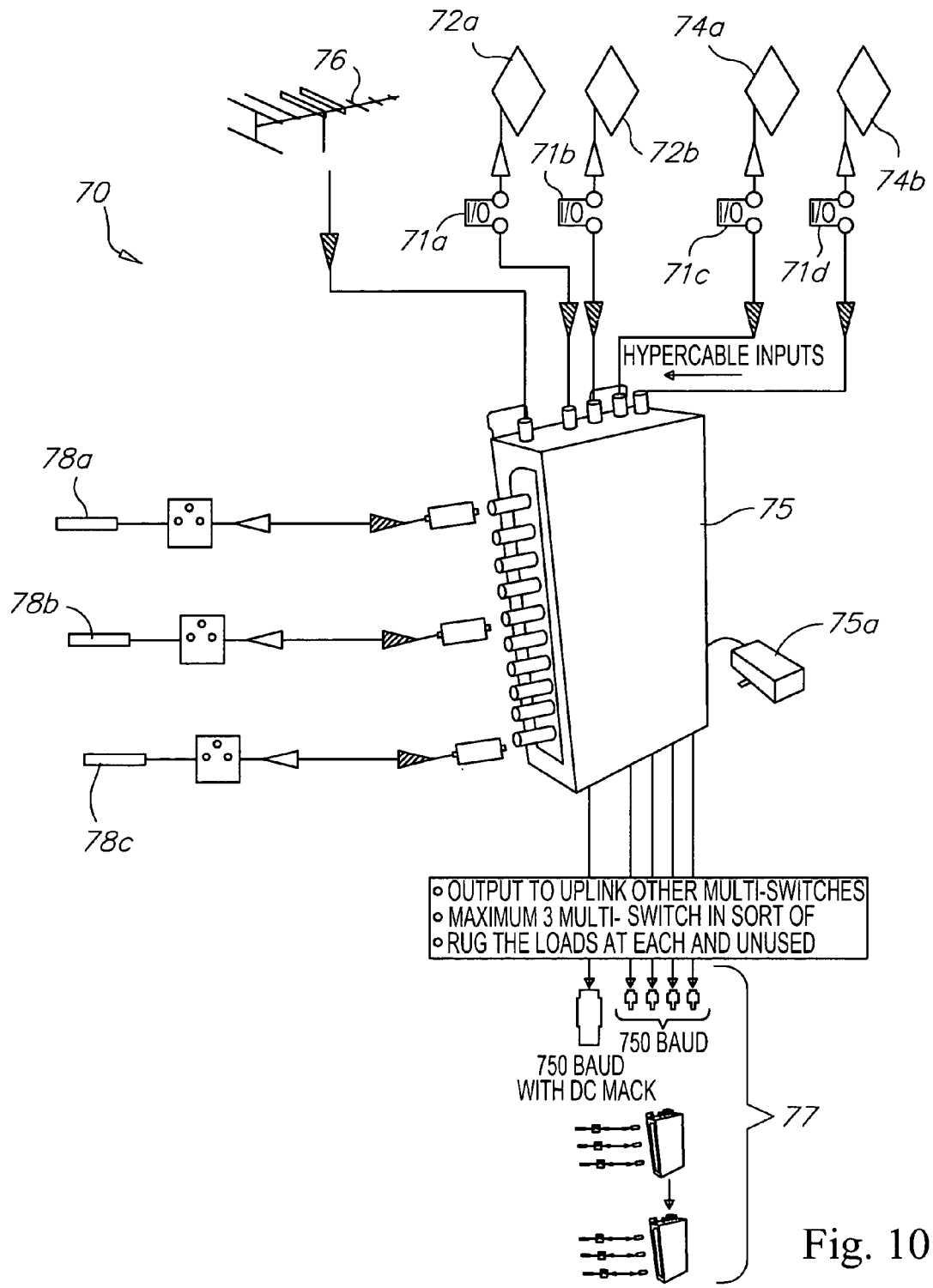
FIG. 10 shows a configuration for collective distribution using the HCC process for multiple antennas.

The configuration of FIG. 10 shows the use of the collective distribution as associated with the multiple HCC antennas and multiple end users. The HCC antennas 72a, 72b, 74a and 74b all include active devices that may continuously adjust signal amplification for transmission into the distribution switch 75. Master decoders 71a, 71b, 71c and 71d read and analyze the signals sent by the HCC antennas 72a, 72b and 74a, 74b. Furthermore, active devices reside within the distribution switch 75, which actively and continuously adjust output signals to HCC decoders 78a, 78b and 78c for receipt by end users. The HCC decoders for end users actively send commands back to the distribution switch 75 in order to control amplification of each individual signal sent to end users. The distribution switch 75 receives power from power supply 75a. In addition to the use of a single distribution switch 75, the present invention may be used with multiple distribution switches to supply even further end users as shown in output 77. As shown in FIG. 10 signals from HCC antennas are relayed through the distribution switch 75 and may be further relayed to further distribution switches 77. The configuration 70 shows that the HCC process may be used continuously through multiple connections to monitor signals from HCC antennas and signals to end users through the distribution switches. The HCC system and process constantly monitors and adjusts amplification levels. The present invention ensures that end users receive acceptable signal strengths within proper ranges associated with the end user decoder for reception by the end user.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for terrestrial transmission of RF signals comprising:
    an antenna, where said antenna includes an active device and a passive device, where the passive device receives RF signals, where the active device includes a plurality of RF signal amplification stages and a plurality of IF signal amplification stages; and
    a decoder connected to the antenna, where decoder receives and analyzes IF signals from said antenna and upon receipt the IF signals sends commands to the active device in order to maintain an acceptable IF signal, where the decoder sends commands that selectively activate or deactivate at least one of the RF signal amplification stages and at least one of the IF signal amplification stages.

2. The system according to claim 1, where said active device down converts the RF signals to the IF signals.

3. The system according to claim 1, where at least one RF signal amplification stage applies a gain onto the RF signals based upon commands from the decoder.

4. The system according to claim 1, where at least one IF signal amplification stage applies a gain onto the IF signals based upon commands from the decoder.

5. The system according to claim 1, where at least one RF signal amplification stage and IF signal amplification stage applies a gain onto the RF signals and IF signals based upon commands from the decoder.

6. The system according to claim 1, where the passive device receives RF signals from a satellite and a broadcast center.

7. The system according to claim 1, wherein each RF signal amplification stage and IF signal amplification stage includes at least one of a low noise amplifier and a low noise block converter.

8. The system according to claim 1, wherein the at least one amplifier may apply a gain of about 20 dB to about 91 dB.

9. The system according to claim 8, wherein the decoder selectively adjusts the gain from about 20 dB to about 91 dB based upon the IF signals.

10. The system according to claim 1, where the commands sent by the decoder are using a DiSEqC process.

11. The system according to claim 1, where said commands and IF signals are transmitted upon a single wire connecting the decoder and antenna.

12. A method for a terrestrial transmission of RF signals comprising the steps of:
    receiving RF signals via an antenna;
    downconverting RF signals to IF signals;
    transmitting the IF signals via a wire to a decoder;
    using a plurality of RF signal amplification stages for RF signal adjustment;
    using a plurality of IF signal amplification stages for IF signal adjustment;
    transmitting commands via the wire to the antenna from the decoder upon receipt of the IF signals;
    selectively adjusting the RF signals and the IF signals based upon the commands; and
    maintaining an acceptable IF signal for receipt by the decoder.

13. The method according to claim 12, further comprising the step of:
    using at least one of a low noise amplifier and a low noise block converter within each respective RF signal amplification stage or IF signal amplification stage.

14. The method according to claim 12, wherein the step of amplifying applies a gain of about 25 dB to about 91 dB.

15. The method according to claim 14, further comprising the step of:
    selectively activating the gain in order to execute the step of maintaining an acceptable IF signal.

16. The method according to claim 12, further comprising the step of:
    amplifying the RF signals and the IF signals based upon the commands.

17. The method according to claim 16, wherein the step of amplifying applies a gain of about 25 dB to about 91 dB.

18. The method according to claim 17, further comprising the step of:
    selectively activating the gain in order to execute the step of maintaining an accceptable IF signal.

19. The method according to claim 16, further comprising the step of:
    using at least one of a low noise amplifier and a low noise block converter to execute the step of amplifying.

20. The method according to claim 12, wherein the RF signal originates from a satellite and a broadcast center.

21. The method according to claim 12, further comprising the step of:
    using a DiSEqC process for the commands.

22. A system for terrestrial transmission of RF signals comprising:
    an antenna, where said antenna includes an active device and a passive device, where the active device includes a plurality of RF signal amplification stages and a plurality of IF signal amplification stages and the passive receives RF signals, where the active device down converts the RF signals to IF signals and applies a gain to at least one of the RF signals and the IF signals; and
    a decoder connected to the antenna, where decoder receives and analyzes the IF signals from said antenna and upon receipt of the IF signals sends commands to the active device in order to maintain an acceptable IF signal, where said commands instruct the active device to selectively activate or deactivate at least one of the RF signal amplification stages and at least one of the IF signal amplification stages.

23. The system according to claim 22, wherein the gain applied may be about 25 dB to about 91 dB.

24. The system according to claim 22, wherein the at least one amplifier selectively applies a gain to both the RF signals and IF signals based upon the commands.

25. The system according to claim 22, where the at least one amplifier includes a low noise amplifier and a low noise block converter.

26. The system according to claim 22, where the commands are using a DiSEqC process.

27. The system according to claim 22, where the commands and IF signals are transmitted upon a single wire connecting the decoder and antenna.

28. A system for terrestrial transmission of RF signals comprising:
  a plurality of antennas, where each antenna includes an active device and a passive device, where the passive device receives RF signals, and the active device down converts the RF signals to IF signals; said active device further includes a plurality of RF signal amplification stages and a plurality of IF signal amplification stages;
  a plurality of master decoders, where each master decoder receives and analyzes the IF signals from each antenna and upon receipt of the IF signals sends commands to each respective active device that selectively activate or deactivate at least one of the RF signal amplification stages and at least one of the IF signal amplification stages in order to maintain an acceptable IF signal; and
  a distribution switch, where said distribution switch receives each IF signal transmitted through each master decoder and transmits each IF signal to a plurality of end user decoders, where each end user decoder receives and analyzes the IF signals from said distribution switch and upon receipt of the IF signals sends commands to the distribution switch that selectively activate or deactivate at least one of the RF signal amplification stages and at least one of the IF signal amplification stages in order to maintain an acceptable IF signal.

29. The system according to claim 28, where each active device of each antenna selectively applies a gain to at least one of the RF signals and IF signals based upon commands from each respective master decoder.

30. The system according to claim 28, where each active device of each antenna and selectively applies a gain to both the RF signals and IF signals based upon commands from each respective master decoder.

31. The system according to claim 28, where said distribution switch includes a plurality of amplifiers that connect to the plurality of end user decoders, each respective amplifier selectively applying a gain to each respective IF signal based upon the commands of each respective end user decoder.

32. The system according to claim 28, where said distribution switch transmits IF signal to at least one further distribution switch, wherein at least one further decoder connects the distribution switch to the at least one further distribution switch.

* * * * *